3,667,903
PROCESS FOR PRODUCING POLYMERIC ALUMINUM-AMIDO-POLYPHOSPHATE

Ernest Stossel, 203 W. 81st St., New York, N.Y.
No Drawing. Filed Oct. 16, 1968, Ser. No. 768,188
The portion of the term of the patent subsequent to Dec. 3, 1985, has been disclaimed
Int. Cl. C01b 25/00
U.S. Cl. 23—105      7 Claims

ABSTRACT OF THE DISCLOSURE

Polymerization products are obtained from aqueous solutions of reactants which are polymerizable at an elevated polymerization temperature above the boiling point of water and which during polymerization become highly viscous or rigid so that mixing of, and uniform heat transfer within, the polymerizing mass are impeded, by subjecting a concentrated aqueous solution of the reactants, which may contain foaming and foam stabilizing agents, to foaming so that a foam consisting of a dispersion of a gas in a continuous liquid phase is formed, the liquid phase consisting of the solution of the reactants being present in the form of thin foam lamellae. The thus-formed foam is then maintained at polymerization temperature until the desired degree of polymerization of the reactants has been reached within the lamellae, and during this polymerization the foam bubbles of the foamed mass are continuously displaced relative to each other. It is acheived thereby that the reaction mixture, due to being in foamed condition, remains easily stirrable and this facilitates relative displacement of the foam bubbles and thereby uniform heat transfer throughout the entire foam mass. Furthermore, the polymerization of the lamellae-forming reaction mixture will take place at an elevated pressure caused by the expansion of the dispersed gas within the individual foam bubbles during the heating of the foam to polymerization temperature.

BACKGROUND OF THE INVENTION

The present invention is concerned with a process of polymerizing concentrated aqueous solutions of reactants which are so viscous or become so viscous and unmanageable during heat polymerization that the reaction cannot be carried out in a uniform and controllable manner, due to the difficulties encountered in mixing, and uniform heat transfer throughout, the stiff or highly viscous reaction mass.

Several processes were proposed for overcoming these difficulties, for instance by dilution and emulsion, and suspension in aqueous media which contain suspending agents, so as to obtain the polymer in the form of small granules which may be separated from the polymerization medium by filtration. To this group of processes belongs for instance the method disclosed in U.S. Pat. No. 2,979,487. The difficulties which are encountered thereby are primarily the heterogeneity of the thus-obtained granular polymers which obviously is undesirable. Furthermore, since these polymerization processes take place in a liquid, generally in an aqueous medium, the processes must be carried out at relatively moderate polymerization temperatures.

Quick and efficient heat transfer throughout the reaction mass calls for uniform, very thin films and a short contact time at the elevated polymerization temperature.

Certain materials may be successfully treated in a so-called "wiped film" unit wherein free floating wipers are held in contact with the walls of an evaporator by centrifugal force. Other types of equipment may be used for the drying stage, such as box type driers after pressure spray atomizers and continuous removal of the product from the floor of the spray dryer by means of a drag. Also tray driers, drum driers or band driers may be used. However, to produce very thin films of liquids, especially of liquids of very high viscosity and solids content poses very serious practical problems.

Large spray driers are in wide use for instantaneous drying of chemicals, food products, pharmaceuticals, clays and pulverulization of molten materials.

Where versatility of atomization is essential for success with respect to a wide variety of materials, however, the maximum concentration which may be advantageously applied will be limited by the ability of the atomizing or spray drying equipment to properly subdivide and spray the material. These difficulties become even more pronounced in smaller driers due to the relatively short distance travelled therein by the spray droplets. But even in large-scale operations, it is sometimes difficult to obtain uniform particles size. Drying and subsequent polymerization of the dehydrated particles cannot be achieved simultaneously unless additional heating devices for the dried particles are provided, for instance by letting the dried particles pass through a "fire-ring" or the like.

It is an object of the present invention to overcome the above-discussed difficulties and to provide a method which may be carried out in a simple and economical manner and will result in the formation of a dried polymerized product of a high degree of physical and chemical uniformity, starting from a solution, generally an aqueous solution, of polymerizable reactants which solution may, and generally will, also contain additional foam-forming and stabilizing agents.

SUMMARY OF THE INVENTION

It is thus proposed according to the present invention to produce, preferably water-soluble, polymerization products from an aqueous solution of reactants which are polymerizable at an elevated polymerization temperature which is above the boiling point of water and which solution during polymerization becomes highly viscous or rigid so that mixing of, and uniform heat transfer within, the polymerizing mass will be impeded.

This is accomplished by subjecting a concentrated aqueous solution of the reactants to foaming so as to form thereof a dispersion of gas in a continuous liquid phase, the latter being present in the form of thin foam lamellae, and maintaining the thus-formed foam at the elevated polymerization temperature until the desired degree of polymerization of the reactants has been reached in the lamellae, while continuously displacing foam bubbles relative to each other, for instance by stirring. By proceeding in this manner, the foamed reaction mixture remains in easily stirrable or agitatable condition due to its foamy consistency and, by such stirring or displacing of foam bubbles relative to each other, uniform heat transfer through the foamed mass will be accomplished and, furthermore, the polymerization will proceed within the lamellae at the elevated pressure caused by the expansion of the dispersed gas during heating of the foam.

Preferably, the aqueous solution of polymerizable reactants will include foaming and foam-stabilizing agents.

The foaming of the aqueous solution may be carried out in many different ways, for instance by mechanical agitation or by incorporating in the solution a surfactant and an agent which is capable of decomposition with formation of gas when being heated at an elevated foaming temperature not higher than the elevated polymerization temperature. Preferably, the solution is subjected to stirring while being heated at foaming temperature, or stirring may be replaced by another method of causing the displacement of foam bubbles relative to each other.

It is also within the scope of the present invention to utilize a gas-forming agent of such nature that the gas formed by decomposition of the gas-forming agent will participate in the polymerization reaction.

It is desirable that the thus-formed foam will be sufficiently stabilized so that no substantial drainage will occur when allowing the foam to stand for approximately one hour and that the foam will be capable of withstanding agitation which might be required for evenly distributing polymerization heat therethrough.

It is also possible to carry out the foaming of the solution of reactants by introduction of a gas into the same.

One other advantageous manner of carrying out the displacing of the foam bubbles relative to each other during heating of the foamed mass at the elevated polymerization temperature provides for passing the foam in a thin layer between two closely adjacent moving heated surfaces. Two moving heating surfaces may be arranged sufficiently close to each other so that upon simultaneous drying the thus-polymerized foam will be broken up into a palpable powder. Suitable equipment for carrying out the last-described modification of the process of the present invention includes conventional rotating double drum driers.

The process of the present invention may find many different uses which include the polymerization of alkali phosphates, the polymerization of a reaction mixture including a phosphoric acid and urea, and the production of alumino-amido-polyphosphoric acid from a solution of reactants which comprise acid aluminum phosphates, phosphoric acid and urea.

DESCRIPTION OF THE PREFERRED EMBODIMENTS

The present invention proposes the drying and polymerization of materials of high viscosity and low thermal conductivity in the form of extremely thin films by means of expanding and eventually exploding bubbles. This, in many operations, appears to be far superior to spray drying or thin film evaporation. It is possible in accordance with the present invention to carry out a continuous foam polymerization which has great technical and economic advantages particularly when carried out on a large, industrial scale.

It is easily possible to obtain, in accordance with the present invention, a great variety of condensation or polymerization products which up to now could be produced only with great difficulty. These compounds include salts containing amido-poly-phosphoric acid complexes which may be used as sequestering and dispersing agents, detergent builders, flame-proofing compounds and special fertilizers.

Ammonium salts of amido-poly-phosphoric acids were produced up to now from phosphorus pentoxide and ammonia in specially built equipment and at rather high costs, but, by the method of the present invention, these compounds can be obtained most economically even by starting with aqueous phosphoric acid obtained by the wet process of producing phosphoric acid. The conventional reaction time of ammonia with phosphorus pentoxide which is of the magnitude of about 3 hours, as described for instance in the U.S. Pat. No. 2,122,122, may be reduced by the process of the present invention to less than 4 seconds, which makes the process of the present invention excellently suitable for continuous operation.

Direct production of metal complexes of amido-polyphosphoric acids is not possible by conventional processes. However, these metal complexes are obtained easily and in a very economical manner from concentrated solutions of acid salts of phosphoric acid and urea by utilizing the polymerization method of the present invention. The ratio of phosphorus to nitrogen to metal may be varied so as to obtain complexes which are practically insoluble in water or complexes which dissolve under formation of extremely viscous solutions, or it is also possible to obtain colloidally soluble compounds or salts which can be easily dissolved in half their weight of water. From these concentrated solutions, films may be deposited, which, upon drying, remain permanently sticky as well as films which form dry to brittle coatings and films of intermediate characteristics.

It is for instance possible to produce, according to the present invention, a typical ionic complex containing phosphorus, oxygen, nitrogen and aluminum for which the tentative formula $[NH_4H.Al(PO_3NH_2.H_2O)_4]_y$ has been established whereby the degree of polymerization, i.e., $y$ depends on pH and concentration. In this respect and with respect to its bonding properties, these practically neutral complexes show similarities with the concentrated acid aluminum phosphates which form so-called aggregation polymers of a degree of polymerization which may range between 2 and 20,000.

However, contrary to these acid aluminum phosphates which are only stable at a pH below 2.5, the amido complexes which may be easily prepared in accordance with the present invention are compatible with alkaline materials. Ammonia does not precipitate alumina and this shows that the aluminum forms part of the anionic part of the complex. Quaternary (e.g., Hyamine) solution which is compatible with acid aluminum phosphate immediately forms a precipitate. This last reaction is suggested as a testing method for the above-described compounds which may be produced in accordance with the present invention.

Such compound or complex is soluble in half its weight of water, first forming a paste which after standing for about half an hour yields a clear, viscous solution from which transparent films of a brittle nature may be deposited. The brittleness of the film may be alleviated by the addition of alkanolamines or polyols in which the complex is soluble. Apparently, the amido group reacts with aldehydes such as formaldehyde. From concentrated aqueous solutions of such a cross-linked polymer, films of a transparent, flexible, incombustible nature may be deposited which become insoluble upon aging or curing. Certain polyvalent metal hydroxides act as insolubilizers in a similar manner as quaternary compounds and polyvinyl alcohols. The complexes and films formed thereof are completely insoluble in oils and in most organic solvents with the exception of glycols and alkanol amines. Since the material imparts fire retarding and potentially intumescing properties to a coating and acts as an excellent disperser for pigments, its use in the coating of paper containers for lubricating oils appears to be of special interest.

A one-pack, self-curing type of inorganic coating which is easier to handle than the two-pack silicate (zinc) coatings may be prepared by mixing zinc dust with the dry, powdered complex and water.

Fire-retardant paints in powdered from which are to be mixed with water before use and waterproofing concrete compounds in powder form are some other possible uses for the above-described complex. It is an outstanding difference of the above-described complex as compared with silicate solutions that the solutions of the complex may be applied from a practically neutral medium or slightly ammoniacal solution and that the dried films do not display any tendency to bloom or effloresce.

The above-described complex, which may be easily and economically produced by the method of the present invention which will be described in greater detail below, may also find useful application as a sequestering agent, as phosphate bonding for mortars, as flameproofing agent and modifier for paper, textiles and cellulosic materials, as a chlorine and sodium ion-free starting material for the manufacture of metal phosphate catalysts used for reforming petroleum products, as a corrosion-inhibiting and phosphatizing agent, an antislip agent, as dispersing agent for pigments, as adhesive (when plasticized with alkanol amines, polyols, etc.), as a coating and paint material and, for agricultural purposes, as low-cost fertilizer with complexed trace metals, somewhat similar to the product which may be obtained in a much more complicated and more expensive manner from phosphorus pentoxide and ammonia.

According to the present invention, the difficulties encountered in certain polymerization processes of highly viscous substances, and of reactants in concentrated aqueous solutions whose polymerization temperature exceeds the boiling point of water, may be overcome to a significant degree by converting the viscous concentrated solutions of reactants into a stable foam. The solutions may also contains reactants which are able to form reactive gases during their thermal breakdown, for instance, urea which may be broken down into ammonia and carbon dioxide, which gas or gases may then take part in the polymerization or condensation reaction.

This may be achieved by adding to the concentrated solution of reactants a relatively small quantity of a foaming agent and of foam stabilizers such as glycols, colloids, fine powders, gums and the like which are known to those skilled in the art as increasing the persistance or stability of the foam lamellae to the desired extent. The thus-prepared solution may then be converted into foam and the foam bubbles broken up into extremely thin and small units in per se known manners. It has been described, for instance by E. Manegold in his German text "Schaum" published 1953, that such a concentrated foam may be broken up to a point where eventually nearly the total liquid content of the lamellae is used for building the thin wall of the bubbles and the foam becomes so well stabilized that no drainage (separation of liquid) will be noticed for weeks. Eventually, the foam becomes so stiff that it may be easily powdered, and after quick drying, converted into a dry powder.

The thus-stabilized foam which may be of the consistency of whipped cream or a shaving cream derived from an aerosol container, may be violently agitated even while being heated and it will be found that the individual foam bubbles possess very substantial resistance against inside pressure, the degree of resistance depending on the degree of the stabilization of the foam bubbles; in other words, the foam bubbles will resist bursting until the interior pressure has built up to a very substantial degree.

It is important for the method of the present invention that a foam be produced which may be handled more or less like a liquid and that the individual bubbles of the foam are resistant to a substantial degree against heat and pressure before bursting, since the temperature of the foam has to be raised uniformly to the polymerization temperature of the reactants contained in the aqueous foam-forming solution, and since eventually a high pressure will be built up within the foam bubbles due to the heat expansion of the gas therein.

Such high pressure which is frequently desirable otherwise could be obtained only in closed vessels, but by building up the pressure within the individual foam bubbles, the entire process may be carried out at ambient pressure and, nevertheless, the foam lamellae, which are very thin, will be exposed to the high interior pressure built up within the individual foam bubbles.

It is significant of the process of the present invention that the condensation or polymerization reactions will take place at the surface of and throughout the cross section of extremely thin films, namely the foam lamellae, so that the polymerized substance will be substantially prevented from reacting with the feed material, and thereby the formation of insoluble products will be eliminated since practically the entire reaction, i.e. the reaction throughout the cross-section of the lamellae, will proceed at once, at the required temperature, and no portion of the lamellae will remain unreacted, underreacted or overreacted.

The reaction time is considerably reduced by proceeding in this manner and thus the present invention lends itself excellently for preparing polymers which, for instance for the reasons discussed above, are difficult to obtain by conventional processes.

These difficulties (which in part will be further described in the eaxmples) may be overcome according to the present invention by dispersing a gas in the concentrated solution of polymerizable reactants and producing thereof a stabilized foam which is uniformly heated in the foam generator to a temperature below the bursting point of the thus-obtained stabilized foam bubbles. The thus-obtained foam in preheated stabilized form is then introduced, for instance into a drying chamber wherein the foam bubbles upon contacting hot gas, will expand to their maximum size and then explode. The drying chamber may be replaced with other heating devices which will be described in detail further below. Thereby, the solution of reactants is exposed to the hot gases in the form of extremely thin films which are immediately dehydrated and which, after bursting of the bubbles, will collect as a very fine powder of uniform particle size. When polymerization of the thus dehydrated material is required, these films, upon being exposed to the polymerization temperature will become immediately polymerized.

For illustrative purposes, it may be mentioned that it is possible under certain conditions to form a film consisting of foam bubbles and weighing only 0.00005 gram per square centimeter, corresponding to a thickness of the film of less than 0.5 micron. Bubbles blown with a simple toy bubble blower show a film thickness in the range of the wave length of visible light, i.e., about 0.4 micron to about 0.75 micron.

The conditions required for stabilizing foam are thoroughly treated in several publications known to those skilled in the art, such as "Surface Chemistry" by J. J. Bikerman, "Theory of Emulsions" by Clayton, "Physical Chemistry of Surface Films" by W. D. Harkins, "Schaum" by E. Manegold and others.

Foams which are produced by mechanical methods such as mixing the continuous phase, i.e. the foam-forming solution—and the dispersed phase, i.e., gas such as air, are usually referred to as mechanical foams in order to distinguish these foams from those in which the dispersed phase is generated by the chemical interaction of the foaming materials or by thermal decomposition of compounds such as urea, guanylurea and other materials used as so-called blowing agents.

Foams might be defined as gas dispersions in liquids, they may also be considered as liquids "diluted" by a gas, or as emulsions having a gas instead of a liquid as the dispersed component. Similar to emulsions, foams are generally three component systems since they usually require the presence of a stabilizing agent.

The requirements for a stable foam the bubbles of which will be capable of withstanding mechanical shock are quite similar to those of emulsions, namely lowering of the boundary tension and suitable mechanical properties of the stabilized film. Stabilization arises chiefly from the marked reduction in the surface energy of the system and of the surface viscosity of the film. The presence of de-soluted, i.e. not dissolved, material in the interfacial area will increase the stability of the foam. There is, however, no significant relationship between the surface tension of the liquid and the size of the bubbles obtained therefrom but the viscosity of the liquid is a definite factor in this connection. Particularly stable foams are obtained if the surface active substance yields a film having high viscosity or the characteristics of an amorphous solid.

The specific surface, i.e., the total surface area in square centimeters, of the gas-liquid interface in one cubic centimeter of foam, is in inverse proportion to the size of the bubbles. The relative foam density, i.e. the ratio of the volume of the foam to that of the liquid contained in it, will be determined by the bubble wall thickness and the total interfacial area.

A well stabilized foam may be transported from one container to another and squirted through a lengthy tube like water, without causing excessive bursting of the bubble-defining film and undesirable separation of liquid or drainage.

Since uniform heating of the foam bubbles is of utmost importance in the process of the present invention, the foam should show substantial resistance to radiant heat while being brought to the required temperature and eventually expanded to its largest possible volume before exploding or bursting. Foams are relatively difficult to heat uniformly due to the almost complete elimination of convection in the gas phase, they are therefore very good heat insulators. This fact plays an important role in the successful performance of the foam polymerization process of the present invention which may combine dehydration and polymerization of the dehydrated material into a single step operation.

During the heating, the temperature of the foam should be raised uniformly while bursting of foam bubbles should be kept to a minimum. The foam bubbles should have sufficient film strength to resist bursting prior to their final heating but should be able to expand to their maximum size (depending on the degree of stabilization) in order to offer the largest possible surface to the incoming stream of hot gas or air, or other heat-conveying means prior to bursting.

In general, the conditions for preparing a stabilized foam for use in the combination of the present invention are similar to those required for fire-fighting foams. These conditions are described, for instance, in "A Study of Mechanically Produced Foams for Combating Petrol Fires" by O. N. Clay, (Dept. of Scient. Ind. Res., Chem. Res. Spec. Report No. 6, 1947) wherein it is stated that a fire-fighting foam could be almost completely defined by its expansion factor, i.e., the ratio of the volume of a sample of foam to that of the liquid contained in it, and its ultimate shear strength. Reference is also made to "Resistance of Foams to Destruction by Heat" by J. F. Fry and R. J. French (J. Appl. Chem., Oct. 1, 1951, page 425 and J. Appl. Chem., 1952, 2, pages 60ff.), showing the manner in which the expansion factor of the foam may be controlled by altering the ratio of air to liquid flowing through the system and showing the relationship of shear strength to the resistance to flow through the "improver" consisting of a tube filled with gauze discs. The maximum resistance to radiant heat will be obtained by a foam of low expansion and high shear strength, and the dependency of the heat resistance index on the water content of the foam is established.

According to the present invention, the liquid to be foamed and air or other gas may be introduced in measured amounts into a foam generator so as to obtain a foam of small bubbles which is heated to polymerization temperature. Preferably, the foam is produced by preheating and the stabilized foam is then further heated to polymerization temperature so that thereby the solution forming the lamellae also may be dried and thus obtained in the form of a stable, uniformly preheated foam which is then introduced, for instance into a hot chamber for final heating so as to complete polymerization and achieve bursting of the foam bubbles to obtain a palpable powder.

The present invention may thus be carried out by first preforming a uniform microbubble foam from a stabilizer-containing solution, which may be carried out in a conventional foam generator of the type which is widely used for foam concrete, calcium silicate foams, latex foams, air entrainment, etc., and then piping this foam into a foam heater stabilizer. This foam stabilizer might consist of a series of metal rings which are separated from each other by exchangeable metal screens and held together like frames in a filter press by means of screws and gaskets so that they might be easily disconnected for cleaning purposes.

These rings with interposed screens, when in working arrangement, form a tube containing the screens of the required mesh width for the production of foam of high specific surface and shear strength. The shear strength obtained for any given air-volume factor is greater with a given number of fine mesh discs than with an equal number of coarser mesh discs. This relationship is linear.

The heating of the stabilizer tube may be achieved by any of the conventional means, for instance a heating sleeve or electric heating tape. When the latter is used, the heating is conveniently effected by exposing successive sections of the tube, in the direction of the flow of the foam, to increasing temperatures. This precaution is recommendable in order to avoid excessively rapid heating of the foam prior to sufficient stabilization thereof. If heating is carried out by passing a heating fluid through a sleeve surrounding the tube, the heating fluid should flow countercurrently, for instance the foam entering the tube from the bottom of an upright tube and passing upwardly whereas the heating gas or steam passes through the sleeve in the direction from top to bottom.

In this manner, the foam is heated slowly while being continuously broken up into smaller and smaller bubbles and is then ejected into the hot chamber, i.e. into the chamber in which polymerization and dehydration is carried out or completed, in the form of a creme composed of preheated, very stable foam bubbles of uniform size which expand immediately upon contact with the hot gases in the hot chamber. The better the prestabilization of the foam, the more expansion of the individual bubbles (and thinning of the film or foam lamellae) can be achieved prior to the bursting of the bubbles into ultrathin film particles which are immediately dehydrated and/or polymeirzed, as the case may be.

The dried film particles accrue in the form of a fine powder which is removed from the hot chamber in conventional manner.

Another way of introducing gas into the liquid and dispersing it uniformly is by internal development of the gas within the liquid.

This may be effected by properly setting the physical condition of the liquid before or at the time of expansion so that the gas, when evolved, will remain in sealed or closed cells and the pressure of the internally developed gas will remain insufficient to rupture the walls of the individual foam bubbles and thus to escape from the particular spot where the gas is developed. The gas may be developed, for instance, by heating a liquid in which a chemical, heat-activatable, blowing agent had been previously dispersed or dissolved. Suitable blowing agents may also be chemicals which react with other chemicals to produce a gas, or chemicals which decompose and evolve a gas under the influence of certain factors, for instance heat.

Quite obviously, a blowing agent will be chosen for the performance of the process of the present invention which is selected from the host of commercially available products which will not adversely interfere with the process, for instance nitrogen-developing compounds which will decompose without leaving solid or liquid residues, such as ammonium nitrite, or compounds which upon decomposition form products which in fine dispersion will become available for reaction with the liquid lamellae, for instance urea which yields, when heated with water, $NH_3$ and $CO_2$.

Suitable nitrogen gas forming compounds include azodihexahydrobenzonitrile having a melting point of 105° C. and azoisobutylnitrile having a melting point of 102–103° C. at which temperatures these compounds split off $N_2$, or p.p-oxydiphenylsulfonylhydrazide having a melting point of 164° C. and decomposing at its melting point to yield 126 cm.$^3$ $N_2$ per gram.

According to a preferred embodiment of the present invention, the concentrated foamable liquid which contains blowing agent may be piped directly to a double drum drier which has been preheated to the desired polymerization temperature so that dispersion of the developing gas will be effected on the heated drum drier.

A combination of dispersion of gas in the foamable liquid carried out in a foaming device and subsequent dispersion of another gas at a higher temperature by decomposition of a blowing agent originally incorporated into the foamable liquid may be utilized for processes requiring such combinations, for instance to increase or change the interior pressure within the foam bubbles during the reaction.

Instead of heating the stabilized foam to polymerization temperature on rotating heated drums of a suitable drier, preferably a double drum drier, other conventional equipment may be successfully used, for instance a multiple gas heated drum drier of the type described in U.S. Pat. No. 2,747,964 for the manufacture of polymeric phosphates, or a kiln as described in the German Pat. No. 1,018,400 to Geiersberger, wherein continuous heating and agitation is effected by heated balls.

However, in many cases a double drum drier will be preferred as especially adaptable for the process of the present invention.

The process of foam polymerization as described herein is particularly well suited to be adapted for polymerization of water-soluble salts of polyacids, such as for the manufacture of polymeric phosphates, whereby it has been observed that drying of the solution of the mixed alkali phosphates prior to polymerization in a rotary furnace, as previously carried out, often leads to segregation of the phosphates and formation of undesirable condensed phosphates, as indicated for instance in U.S. Pat. No. 2,747,964.

In most of the conventional processes for manufacturing polymeric phosphates, an intimate mixture of the mono- and di-sodium phosphates, in correct proportions, is provided by spray drying under conditions which preclude agglomeration prior to kilning in order to produce a polymeric product substantially free from undesirable materials. However, the difficulties still encountered by proceeding in this manner can be overcome and the cumbersome procedure may be eliminated by converting the concentrated solution of the phosphate mixture, in accordance with the present invention, into a stable foam by adding foaming and stabilizing agents and by then bringing the stable foam directly to the required temperature of polymerization, which may be accomplished in, per se, conventional equipment.

Thus, it is possible by proceeding in accordance with the present invention to substantially simplify the manufacture of water-soluble amidopolyphosphates, which are widely used as fire retardants, fertilizers, sequestering agents and the like.

While most water-soluble alkali phosphates may be prepared by dehydrating orthophosphate salts, the dehydration of ammonium phosphates at atmospheric pressure does not lead to water-soluble ammonium polyphosphates. As described by Thilo and Grunze, Zeitschrift Anorganische Allgemeine Chemie, vol. 281, pages 262ff. (1955), diammonium phosphate starts rapidly to decompose above 70° C. ($NH_3$ pressure of $(NH_4)_2HPO_4$ at 50° C. equals 0.2 mm. Hg, at 100° C. 9.1 mm. Hg, at 120° C. 27.4 mm. Hg) so that first monoammonium phosphate is formed (with loss of ammonia) which upon further heating is smoothly converted, by dehydration, into the linear highly polymeric ammonium metaphosphate $(NH_4PO_3 \cdot xH_2O)_n$. Upon loss of about 1 mol of water, (0.95 mol) deammoniation starts at about 190–200° C. and the polymer $(NH_4 \cdot PO_3 \cdot H_2O)_n$ is converted into $(HPO_3)_n$ polymeric metaphosphoric acid, represented mostly by insoluble compounds.

Thus, water-soluble ammonium salts of amidopolyphosphoric acid were obtained up to now by reacting phosphorus pentoxide dispersed in an inert solvent with gaseous ammonia, as described in U.S. Pat. No. 2,122,122. By reacting the combustion product obtained by igniting elemental phosphorus in an excess of dry air with anhydrous gaseous ammonia at temperatures of about 240° C. a similar result is obtained according to U.S. Pat. No. 2,717,198. More or less similar processes are disclosed in U.S. Pat. No. 3,226,222 and by Stinson et al. in "Agricultural and Food Chemistry," vol. 4, No. 3, page 248.

The process of the present invention eliminates the cumbersome steps required according to these prior-art methods and also the need for special equipment, by converting concentrated ammonium phosphate solutions which also contain foaming and stabilizing agents into a stabilized foam and heating the stabilized foam to the polymerization temperature with continuous agitation or otherwise displacement of the foam bubbles relative to each other. It has been found advantageous to form the ammonium phosphate directly from aqueous phosphoric acid and urea, whereby the latter compound may be dissolved in the phosphoric acid at temperatures below 90° C., but will decompose at temperatures above 90° C. in the presence of water into ammonia and carbon dioxide, which two gases will create sufficient pressure in the stabilized foam bubbles at the polymerization temperature of between about 180° and 210° C., to immediately convert ammonia and phosphoric acid into a water-soluble polymer consisting of ammonium-amidopolyphosphates. The chemical aspects of this process, however not the present method of carrying out the process, are described in my copending patent application Ser. No. 451,959, now U.S. Pat. 3,414,374.

The thus-obtained compounds correspond in analysis and characteristics to products which were available up to now only by reacting ammonia with phosphorus pentoxide.

Generally, the manufacture of the reaction products of ammonia and phosphorus pentoxide requires a reaction time of between about 1 and 5 hours, whereas the reaction time according to the process of the present invention, wherein the polymerization is carried out as foam polymerization in the above described manner, may be reduced in continuous operation to usually less than 5 seconds.

It may be noted at this point that the present invention is primarily concerned with the, so to say, manipulative steps of a novel method, whereby certain chemical reactions which, per se, may be old, may be carried out in a particularly advantageous, simple, fast and economical manner. The method of the present invention is particularly suitable for obtaining in such highly advantageous manner the products which are disclosed in my copending application Ser. No. 451,959.

Certain reactions of urea with polyvalent acids are well known. For instance, Steigman, Journal Soc. Chem. Industry 662 (1946) 176 describes a process of obtaining citracinic acid by simply heating a mixture of citric acid and urea at 180–200° C. The triamide of citric acid appears to be readily formed and deamidated to citricinic acid. This reaction may be used as a test for citric acid according to the publication by Feigl "Spot Tests," Elsevir Publ., London, 1954, page 263. When urea is heated from its melting point (132° C.) to temperatures up to 170° C., the gaseous ammonia formed thereby acts on citric acid at a temperature which otherwise would be reached by the superheated gas only in a closed vessel. Furthermore, the loss of water which is essential to the amide formation and its volatilization can now occur in the hot melt. A fact which seems to have been overlooked is the unusual effect of the presence of carbon dioxide in the system which was described by Chervins U.S. Pat. No. 2,225,115. Reacting monochloroacetic acid with ammonia to form glycene, Chervins found a considerable increase in yields in the presence of carbon dioxide, namely 1 mol of the halogen compound with 4 mols of anhydrous ammonia yielded 21% amine, by increasing the amount of ammonia to 10 mols per 1 mol of compound the yield could be increased to 58%. He reported however that by adding one mol of carbon dioxide to one mol of the halogen compound and 4 mols of ammonia, the yield of amine could be increased to 60% and with eight mols of ammonia and 2 mols of carbon dioxide to 71%. These results may also be obtained by substituting ammonium carbonate, ammonium bicarbonate and ammonium carbonate for ammonia.

Urea decomposes in the presence of water at temperatures above 140° C., practically completely into $NH_3$ and $CO_2$, whereas in the absence of water heating of urea to temperatures above 140° C. will result in the formation of biuret and cyanuric acid as well as other condensation products, without development of significant amounts of carbon dioxide.

A certain amount of water appears to be necessary for increasing the yield of the above-described complexes, to develop sufficient volume of gas and to keep formation of byproducts at a minimum.

While thus a relatively small proportion of water is required, all excess of water does not interfere with the above-described reaction and process, except that more time and fuel are required for dehydration before condensation will take place.

Thus, the difficulties encountered up to now in hotmelt polymerization processes of this type are easily overcome by foam polymerization as described above.

The presently described process is excellently suitable for producing in an effective and economical manner, and on a large industrial scale, neutral ammonium-metal-amidopolyphosphates such as are described in my copending application Ser. No. 451,959, the contents of which are incorporated herein by reference.

It is a significant improvement in the making of these compounds to convert the concentrated solution of the acid metal-phosphate, urea and foaming agent first into a stabilized foam, for instance of the consistency of whipped cream (which may be carried out by any one of the known mechanical foaming processes, or by heating under continuous agitation) and to introduce the thusformed heavy foam into a double drum drier heated to the polymerization temperature, generally between 150 and 215° C. and preferably between 190 and 200° C., as described in more detail in the examples.

By proceeding in this manner, no further stabilization of the foam is required, since one of the first reactions, taking place will result in the separation of colloidal aluminum hydroxide which will be located within the foam lamellae upon decomposition of urea into ammonia and carbon dioxide. The more concentrated the solution becomes due to evaporation of water, the more colloidal aluminum hydroxide will be embedded in the foam lamellae and will make the foam more persistent and stabilized. Consequently, higher interior pressures may build up within the bubbles before causing bursting of the same. Since during this reaction ammonia gas will not escape, a flash reaction will take place as soon as the foam hits the hot rotating surfaces of the drums. The continuous process which thus may be carried out can be easily and automatically controlled, particularly as to the desired temperature. Provided that the important process parameters such as concentration of the solution, stabilization and feeding rate, as well as the interior pressure under which the first reaction takes place are maintained without significant changes therein, the reaction on the double drum dried will be primarily a function of its temperature. By processing as described, no insoluble compounds are formed, which may be formed by undesired reactions of acid feed material with the polymerized complex or overreacted polymers, and a water-soluble product is obtained, excellently suitable for the above-indicated purposes and not requiring any further processing.

The process of the present invention has been described primarily as foam polymerization for converting acid aluminum phosphate and urea solution into a water-soluble complex of neutral ammonium aluminum phosphamic acid compounds, which process is carried out in a continuous single operation in accordance with the present invention, whereas up to now this was not possible because of the many difficulties encountered particularly due to side reactions and undesirable polymerizations. However, the process of the present invention is equally applicable to other chemical systems where more or less similar conditions prevail, namely where it is possible to convert the aqueous solution of the reactants first into a stabilized form and then performing the reaction at atmospheric pressure between the developing gas and the extremely thin films or lamellae of the expanding bubbles, under conditions which otherwise generally can be achieved only by application of external pressure and generally only on a small scale.

Many conventional processes thus may be carried out in accordance with the present invention in an easier, faster and more complete manner by converting the solution of the reactants first into a stabilized foam and then continuing to proceed as described above.

These processes include, but are not limited to, polymerization of vinyl chloride or vinyl acetate. Many of the difficulties encountered in suspension polymerization are overcome thereby and the reaction time is considerably reduced.

Modified starches of extremely small particle size are easily obtainable by heating a foam prepared from a concentrated slurry of reactants, which is then dried over rollers at the required temperature. Temperature control, which is important for these processes, may be easily achieved, as well as the desired particle size. Alkali polyphosphates are also obtainable in a continuous one-step operation and in an especially useful small particle size. Dried redissolvable lattices may be obtained as fine powders. Furthermore, condensation of aminocarbonic acids to form polyamides, which become extremely viscous during the polymerization process so that a uniform heating of conventional reaction masses is impossible, may also be easily performed in accordance with the present invention.

In connection with the preparation of modified starches, phosphate starches such as described for instance in U.S. Pats. Nos. 2,865,762, 2,328,537 and 2,813,093 can be advantageously prepared by the method described above. Also, fire-resistant water-based hydraulic fluids consisting essentially of alkanolamine borates and glycolborates condensates, and polyamides formed of aminocarbonic acids may be prepared by the foam polymerization method of the present invention.

It has been described in application, Ser. No. 451,959 that completion of the reactions referred to therein will depend on uniform heating and continuous mixing during heating, in order to avoid the formation of heat and moisture-impermeable surfaces of polymerized products while part of the reactants are still in an intermediate state or did not yet react at all.

Thus, complete polymerization could not be achieved and the reaction required a considerable length of time. Furthermore, conversion of the processes described in application Ser. No. 451,959 to larger scale production increased the difficulties and made it practically impossible to obtain a uniform product, for instance a completely soluble product, free of an insoluble residue.

Similarly to emulsion and suspension polymerization, for instance by processes described in U.S. Pats. Nos. 2,559,752 and 2,979,487, the surface active agents have to be carefully selected for each process to be effective in very small concentration so as to avoid substantial contamination of the finished products.

The preparation of the complexes described in my above-mentioned copending patent application is difficult because the reaction does not take place in the desired direction by directly heating the solution to polymerization temperature; soluble products are obtainable only by heating extremely thin films of the solution of reactants and by uniformly raising the temperature, the latter condition causing additional difficulties; and the aqueous solution will have to be present during the entire reaction period in an extremely thin film whose surface should be continuously regrouped to make it available for surface reaction and avoid secondary reactions of polymerized products with unreacted or only partially reacted feed material.

These problems are proposed to be solved in accordance with the foam polymerization process of the present invention, as described in the examples starting with Example 5, according to which polymerizable reactants may be polymerized in and from their aqueous solutions at temperatures considerably higher than the boiling point of the dispersing media, so as to form a homogeneous product even in large scale and continuous production. This is achieved according to the present invention by dispersing the aqueous solution of reactants in the form of a stabilized foam which as such may be heated with continuous agitation to the polymerization temperature and reacted at the high pressure created within the individual foam bubbles by heat and/or thermal decomposition of heat sensitive compounds capable of forming a gas when heated to such temperatures.

The following examples are given as illustrative only without, however, limiting the invention to the specific details thereof.

Examples 1–4 will serve to illustrate, by comparison, the process as described in my copending patent application, Ser. No. 451,959, and Examples 5–13 illustrate the foam polymerization process in accordance with the present invention.

The following examples describe the reacting of an aqueous mixture containing aluminum acid phosphate, phosphoric acid and water in the proportions of 1 mol $Al(H_2PO_4)_3$, 1 mol $H_3PO_4$ and 7 mols water and 4 mols of urea. The solution will also contain a small proportion, such as 0.01%, of an acid resistant foaming agent surfactant, for instance a fluorocarbon surfactant known to those skilled in the art, such as the products available from MMM under the designations FC 95 and FC 98. This mixture is prepared at a temperature below 90° C. The thus-obtained concentrated solution contains 16% water and has a specific gravity of 1.58 at 25° C. This concentrated solution will be referred to in the following examples as "Solution A."

EXAMPLE 1

160 grams of Solution A is poured on an aluminum tray, measuring 300 x 340 mm. and the liquid evenly distributed to form a thin layer on the bottom of the tray. The tray is then put into an oven which has been heated to a temperature of 160° C. and kept at this temperature for 20 minutes. After a few minutes, a heavy foam starts to form on the surface and eventually hardens to a friable, spongy crust, while the inside of the thin layer becomes a sticky mass. The reaction product is cooled and passed through a 40 mesh sieve to separate a fine powder from sticky residue. The powder is mostly soluble in water and shows an acid number of 140. The residue is partly soluble in water, but more soluble in ammonia and monoethanolamine.

The residue is put again into the oven, heated to 160° C. and kept there for 20 minutes. A considerable part of the residue is thus converted into a water soluble powder, acid number 116.

EXAMPLE 2

Example 1 is repeated but the oven temperature is raised to 215° C. After 4 minutes heating at this temperature, the heavy foam hardens and a friable, spongy material is obtained which has an acid number of 112. The product when separated from small parts of sticky materials, as in Example 1, is mostly water soluble, but with a small fraction of insolubles separating from the solution upon standing.

EXAMPLE 3

Example 2 is repeated and heating at 215° C. prolonged to 8 minutes. The acid number was found to have increased to 124, and the amount of water insoluble materials is greatly increased.

EXAMPLE 4

Example 1 is repeated but the amount of concentrated Solution A poured on the tray is reduced to half the amount used in Example 1. A heavy foam forms within a few minutes. Thereafter, heating is continued for 40 minutes at 160° C. and the reaction product treated as in Example 1. Practically no unreacted material remains on the sieve and the powder which passes through the sieve is soluble in about 50% of its weight in water, forming first a heavy slurry which turns into a viscous transparent solution after standing for several hours. Acid number 110.

It thus appears obvious that the conversion of aluminum acid phosphate and urea (as described in my copending patent application) takes place mostly on the surface of the reacting material. Products obtained as in the previous examples are not uniformly reacted, and the amount of insoluble products increases when reacting larger quantities.

EXAMPLE 5

Solution A was poured evenly onto the top of the drums of a double-drum dryer (diameter 60 cm., length 60 cm.), heated by oil or direct firing to a drum surface temperature of 220° C. The heating of the drums was adjusted to compensate for heat losses due to evaporation of water, so that a constant temperature of 200° C. was maintained, and the process temperature well controlled.

After several preliminary tests a drum speed of 8 r.p.m. was found recommendable for these tests. The drum clearance was 0.8 mm., so that at the process temperature no liquid could pass between the drums. Immediately upon contacting the hot drums with Solution A, a heavy foam formed which expanded in a vehement movement within the space formed between the drums. The feeding of the liquid was regulated at such a rate that the expanding foam filled the space between the drums which might be calculated as $$l \cdot \frac{R^2}{2} (4 - \pi)$$

wherein R=radius of drums; $l$=length of drum, without overflowing, and the thus available space sufficient for expansion to about 80 fold the volume of the feed liquid was provided. The feeding of the liquid by a conventional pendulum feed allowed uniform covering of the drums with foam. In one test, the Solution A was fed at a temperature of 80° C. directly onto the drums, in another test the liquid was piped first through a heated pipe wherein the temperature was maintained at 110° C. and the liquid was converted into a heavy foam which was then spread as such onto the drums.

In the latter case the temperature of the drums could be slightly reduced (to 200° C.) at the same drum speed of 8 r.p.m. and more easily kept constant. A finer powder was obtained which could be easily scraped off from the rotating drums by means of conventional knives. Since the whole reaction took place with vigorous movement of the foam bubbles, the extremely thin films of the expanding bubbles were exposed immediately and uniformly to the conditions under which the series of reactions took place on the large surface. Although it has not been possible to calculate exactly the surface area available in the foam, it may be estimated that under the prevailing conditions the surface area of foam bubbles of 1/10 mm. radius would be about 1000 fold the surface area of the liquid when spread onto the drums as a film of 1/10 mm. thickness. A 1000 ccm. measuring cylinder was filled with the foam taken from the space between the drums, and the specific gravity of the foam was found to be 0.023 g. at 25° C. After several hours standing the collapsed foam yielded 14 ccm. liquid. Within these thin films urea reacted immediately with water at this high temperature forming carbon dioxide and ammonia which precipitated aluminum hydroxide (phosphate) in colloidal form within the lamellae of the foam bubbles.

The foam is stabilized in this manner and will be capable of resisting the interior pressure which is building up within the foam bubbles due to the high operating temperature. All subsequent process steps may then be carried out within seconds. These process steps may include dehydration and amidation at high temperature and pressure, formation of amido metallophosphoric acid and eventually its ammonium salts without intermediate formation of insoluble reaction products (e.g. between unreacted acid feed material and reaction product), as well as without formation of insoluble compounds formed by de-amidization of amido compounds due to local overheating.

Although the pressure within the foam bubbles could not be measured, it is interesting to note that in the manufacture of urea from ammonia and carbon dioxide at 190° C., pressures of up to 200 atmospheres are applied. Under these conditions of high temperature and pressure ammonia and water exist separately and may each serve as reactant.

The time required for the individual reactions in the continuous operation of the foam polymerization process may be approximately calculated by the speed of the drums, i.e. the rotations of the drums per minute, and was found in the presently described test as being between about 5 and 7½ seconds. However, preliminary tests showed that the reaction time may be further reduced by improving the heating system, for instance by flame heating of the drums, whereby care has been taken to maintain the drum surfaces, in per se conventional manner, at the desired temperature.

About 3 mols of ammonia are developed in the production of 1 mol of aluminum-amido-polyphosphate complex and the freed ammonia can be easily recovered by means of a conventional gas scrubber communicating with the cover of the drum dryer. Since the development of ammonia gas will take place continuously, in contrast to the reaction in a batch process, the whole operation can be easily controlled, analytically and also by conventional automatic devices, so that overheating and formation of insoluble byproducts can be completely avoided.

The polymerized, dried material is obtained directly, by scraping from the drum surfaces with conventional scraper-knives, in the form of an easily water soluble powder. Sometimes the powder tends to stick to the knives and to agglomerate to small lumps, which, however, can be easily converted to a fine powder. This powder, when mixed in a proportion of 50% of its weight with water, forms first a slurry which changes within about half an hour into a viscous clear liquid. The latter may then be further diluted with water. Heating to about 55° C. and stirring accelerates the dissolution. Comparing the analytical data found in my above-mentioned copending patent application with the analysis obtained from the dissolved product, it seems that the freshly prepared complex is insoluble in water and becomes soluble after a hydration process takes place whereby two amido groups of the amido-metalopolyphosphate complex are converted into cationic ammonia. The analysis of the dry material described in Examples 15 to 19 of application Ser. No. 541,959 corresponds to a formula

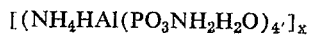

or 14.05% of total nitrogen, of which 3.4% was in the form of free ammonia and 10.65% present as amide nitrogen. In an analysis of the dissolved product, prepared according to the present invention by foam polymerization, the total nitrogen was found to be 14.25%, of which 8.55% was free ammonia, and 5.70% corresponded to amide nitrogen. (Analyzed by the "Victor Method," Issue No. 1 as described in my co-pending application.)

After standing for several days, the pH of the solution changed from 5.5 to 6.2 and a precipitate was formed. The shelf life of this solution may be considerably improved by stabilizing it by the addition of from 2 to 5% of a lower alkanolamine, e.g. monoethanolamine, isopropanolamine or mixed isopropanolamine, to raise the pH of the solution to 7, or slightly higher. The addition of the alkanolamine will tend to reduce the viscosity of the concentrate and plasticize the films formed upon drying, as well as to increase the water solubility and stickiness of the film. The amount of the alkanolamine to be added will be dictated by the end uses. If a source of colloidal aluminumhydroxyphosphate, e.g. for manufacturing catalysts or for reinforcement of latex is needed, or for fire-retardant coatings, smalled quantities of alkanolamine or none at all are recommended. For the preparation of adhesives and for the detergent industry the percentage may be higher, usually 5% or more.

EXAMPLE 6

The clear, concentrated solution prepared as in Example 5 was dried on a Teflon coated drum in the form of a thin film (e.g. ½ mm. thickness) at a temperature not over 70° C. A product was obtained, consisting of glass-clear scales which dissolve readily in water.

$Analysis.$—$P_2O_5$, 51.8%; $Al_2O_3$, 9.1%; $N_2$, 12.5% ($NH_3N$, 7.6%; amide N, 4.9%.

EXAMPLE 7

100 grams of finely powdered ammonium salt of alumino-amido-polyphosphate complex, prepared, according to Example 5, by foam-polymerization, were extracted for 30 minutes with 500 ccm. of ethanol 95.6%. The alcohol extract contained 2.2% of a water soluble salt, a mixture of urea, biuret etc. The residue, after evaporation of alcohol showed the same characteristics as the original salt and could be dissolved in the ratio of 3:2 in water to form a heavy, viscous liquid. 1000 ccm. of a solution was prepared by dissolving 600 grams of the complex prepared according to Example 5 in 400 ccm. of water. To 50 ccm. portions of this concentrated solution were added under stirring 2.5, 5, 7.5 and 10 grams of alcohol. By addition of 2.5 grams of alcohol a heavy jelly was formed which became fluid when stirred, 5 grams formed a still flowing gel; 7.5 a stiff gel; further addition caused the gel to break to a dry precipitate.

Each 40 ccm. of the above solution was mixed, prior to the addition of the alcohol, with 15% of glycerol or sorbitol or molasses. Thereafter, 2.5, 5, 7.5 and 10 grams of ethanol were added, as described above. No gel formation took place immediately upon addition of alcohol, but when stirring was continued for 10 to 15 minutes a soft jelly formed which became of the consistency of petroleum jelly when the same amount of alcohol had been added which caused breakage of the gel in the polyol-free test. The dry precipitate of the polyol-free solution as well as the jelly formed from the solution to which polyols had been added dissolved clearly in about its own weight of water to form a thin solution. However by dissolving it in 20% aqueous ethanol, a colloidal solution was obtained. The aqueous solution penetrated into paper, the alcohol-water colloidal solution could be spread on paper evenly without passing through it. The dried film rendered paper and cellulosic materials flameproof, although up to 20% of organic materials had been added, to form a flexible, brilliant, plasticized film.

By modifying the ratio of polyols (sugars, glycerol, glycols etc.) alkanolamines and alcohols (monohydric, water-soluble) to the concentrated solution of the aluminum-complex prepared according to Example 5, the physical characteristics may be changed and the particle size controlled from a clear, water soluble thin solution, to a colloidal solution, to a jelly, stiff gel and finally to a fine precipitate. The exact nature of the bonding of polyols to the metalo-nitrogen-polyphosphate complex is not known, but a complex-like linkage seems probable (as sugested in U.S. Pat. No. 2,739,076 and U.S. Pat. No. 3,004,921).

EXAMPLE 8

Several tests were made in which the conditions described in Example 5 were modified, by changing the speed and temperature of the drums.

The drums were heated to a surface temperature of 300° C. and the drum speed reduced to 4 r.p.m. About 7 mols of $NH_3$ for each mol of $Al(H_2PO_4)$ were evolved which corresponds to a practically total loss of the available $N_2$. A very fine powder was obtained which was insoluble in water, but could be used, due to its large surface areas, as an easily dispersible filler for fire retardant paints and as an absorbent. Analysis corresponded closely to that of a mixed polymer of aluminum-phosphate, ammoniummetaphosphate and metaphosphoric acid $(Al(PO_4)_x$, $(NH_4(PO_3)_y$ and $(HPO_3)_z$ However, when the drum temperature and rotational speed were correspondingly increased, water soluble amido-nitrogen-containing products as in Example 5, were obtained as long as the temperature of the foamed liquid remained constant, at about 190 to 200° C.

| Drum speed, r.p.m. | Temperature, °C. | Feed, kg. per minute | Yield per hour, kg. | Drum radius, cm. |
|---|---|---|---|---|
| 6 | 220 | 1.6 | 60 | 30 |
| 8 | 240 | 3.3 | 125 | 30 |
| 10 (flame heated) | 240 | 4.2 | 156 | 30 |

EXAMPLE 9

The product obtained by the reaction as per Example 5 in the form of a friable solid was finely powdered together with from 10 to 500% of kaolin of low iron content, and mixed for use with the necessary amount of water to prepare a well dispersed mineral paint.

Other pigments and fillers (even of slightly alkaline reaction, e.g. calcium carbonate, magnesium oxide and the like) were added in similar tests. The powder mixture when kept dry had an unlimited shelf life. After being mixed with the necessary quantity of water, the finely dispersed slurry may be easily applied, and will dry on the substrate to form a hard surface. The consistency, flexibility and flow characteristics were modified in accordance with Example 6, by adding to the slurry dispersion polyols (sugars, molasses, sorbitol, etc.), alkanolamines and alcohols (isopropylalcohol) as described in that example. After drying for several days, the kaolin and aluminumamidopolyphosphoate mixture dried to a hard compound which could be cut with a knife with difficulty only, and which became fairly resistant to water, but disintegrated slowly when submersed in water.

EXAMPLE 10

The following samples were prepared in order to improve the water resistance of the final product (coating). 60 parts by weight of the complex obtained by foam polymerization as per Example 5 were intimately blended with 125 parts of kaolin and 6 parts of dimethylolurea (M.P. 125–26° C.) and 5 parts of sorbitol (powder). This mixture remained stable when kept in a dry container. 100 parts by weight of this mixture were then poured into 100 parts of water and stirred until a uniform slurry was formed. The consistence of the slurry was modified by adding from 2 to 8 parts by weight of isopropanolamine to make it free flowing. A paper carton was submersed in the liquid (or the liquid applied to the carton by spraying) then excess liquid was squeezed off, and coated carton cured at 125° C. for one hour. A flameproof, fire-resistant carton was formed which was grease and oil resistant and, therefore may be used for producing oil containers of considerably increased fire-resistance. Between one and 10% by weight of dimethylolurea parts were employed with good results. For the manufacturing of molded plaster products, an addition of from 2% to 10% of dimethylolurea is recommendable, to obtain smooth, hard surfaces.

Another sample of improved water resistance was prepared by mixing 400 grams of a surfactant-treated clay (as described by Alan S. Michaels, in Industrial and Engineering Chemistry, vol. 48, No. 2, p. 297) with 600 grams of clay coated with a concentrated solution of the aluminum complex obtained as per Examples 5 and 7, and drying it to less than 14% of water content. The surfactant used for treating clay (kaolin) according to Allan, is Hyamine 1622 (Rohm & Haas, cationic surface active agent) which might be used in the mixture in powder form, or a small quantity of another cationic surfactant e.g. rosin amine acetate (Hercules Comp.) may be used. Since most natural aluminosilicates behave in aqueous dispersion as anionic colloids, and the anionic aluminoamidopolyphosphate becomes insoluble with cationic surfactants, as described in application Ser. No. 451,959, eventually an insoluble compound will be formed when such a mixed powder is contacted with water and applied as slurry.

EXAMPLE 11

A crude about 50% phosphoric acid obtained by the wet process was partially neutralized to a pH of about 4.5 by the addition of ammonia. The hot liquid was filtered to eliminate most of the precipitated impurities, and the filtrate reduced to a concentration of 75–80% $NH_4H_2PO_4$. The concentrated solution was mixed at a temperature below 80° C. with urea in an amount 10–15% in excess of the amount still required for the eventual formation of diammonium phosphate and 0.01% of fluorocarbon surfactant, such as FC 95, were added as well as about 1% of dimethylolurea. The mixture was passed at between 80 to 90° C. through a conventional foam producer and emerged as a heavy, persistent foam of the consistency of whipped cream. The bubble size may be reduced to a diameter from 0.01 to 0.1 mm. The heavy foam is then placed on the heated drum dryer, heated to about 200° C., and treated as described in Example 5. A friable powder was scraped off the drums. The analysis of the powder corresponded closely to that of monoammonium-polyphosphamate ($P_2O_5$, 62.3%; $N_2$, 24.6%; half of which was found to be $NH_3$ nitrogen half amide nitrogen). The product resembled in its behavior the commercial ammonium salts of amido-polyphosphate (e.g. Victamide, prepared according to U.S. Pat. No. 2,122,122 by condensing phosphorus pentoxide suspended in an inert liquid with gaseous ammonia), or the product obtained according to U.S. Pat. No. 3,226,222 to Hibbits. The product was very hygroscopic and liquefied in contact with moist air.

EXAMPLE 12

The procedure of Example 11 was repeated but different molar proportions of $Al(H_2PO_4)_3$ and of urea as described in Example 5 were added to the concentrated solution before foaming. The decrease of hygroscopicity was in direct proportion to the increase of the amount of aluminum acid phosphate added.

A mixture containing 30% of aluminum-complex remained dry for several days even when exposed to moist air but was easily soluble in water. Due to its excellent dispersing action and water softening characteristics it may be used in the detergent industry, principally in compounding of synthetic detergents, since it seems that its content of colloidal aluminum-hydroxide-phosphate greatly improves the washing process.

EXAMPLE 13

In order to adapt the foam-polymerization process for manufacturing of polymeric alkali-phosphates, the process described in U.S. Pat. No. 2,747,964 was modified, by converting the solution of the mixed sodium orthophosphates ($Na:H_3PO_4 = 1.5:1$) into a stabilized foam by adding to the concentrated solution heated to 75° C. and containing less than 20% water, a foaming agent of the fluorocarbon surfactant group, for instance the product trade named FC 95, in the proportion of 0.01% of the solution, and also adding 1% of aluminum hydroxide and passing the hot solution mixed with air through a commercial foaming apparatus. Except for replacing the step of spray drying with the above described foaming the polymerization of the present invention is carried out in conventional manner. According to the last mentioned patent, the purpose of spray drying, before polymerization in the kiln at from 350 to 450° C., is to intimately mix the phosphates used as feed material before polymerization, to avoid segregation of phosphates of different solubility during heating and subsequent formation of undesirable condensed phosphates so as to eliminate formation of by-products. Since operational control of spray drying is rather cumbersome and requires accurately adjusting droplet size (degree and type of atomization) as well as air flow rate, air temperature, humidity and retention time in the drying chamber, the advantages of foam-polymerization which does not require such complicated controls are obvious. Dehydration and polymerization take place on a thin surface not obtainable even by the most efficient spray-dryers. Plugging of nozzles is completely avoided, and temperatures are easily controllable.

When the foam is brought in contact with the heated drums maintained at a surface temperature of about 400° C., the bubbles expand somewhat similar to what has been described in Example 5. In the present case expansion of the bubbles is caused by hot air and superheated steam sealed within the individual bubbles, and dehydration and polymerization is achieved with continuous agitation in a continuous operation within from 30 to 60 seconds. The finished product is scraped from the drums as a fine powder.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. The process of producing a polymeric aluminum-amido-polyphosphate complex compound comprising forming an intimate mixture of an aluminum acid phosphate, phosphoric acid, water, a blowing agent which when heated under the conditions of the reaction develops ammonia gas, and a surface-active agent, preheating the mixture to between about 80 and 110° C. while agitating it so as to form a foam thereof and continuing the heating and agitation until a temperature between about 180° and 210° C. is reached at which the mass is polymerized, and finally recovering the formed polymeric product.

2. The process of claim 1 wherein said blowing agent is urea.

3. The process of claim 1 wherein said surface-active agent is a fluorcarbon surfactant.

4. The process of claim 1 wherein said aluminum acid phosphate in the said mixture comprises one mol of $Al(H_2PO_4)_3$, seven mols of water and four mols of blowing agent in the form of urea.

5. The process of claim 1 wherein the said preheated mixture is passed between two heated closely adjoining revolving drums where it forms a thin film on the drums, the temperature of the drums being sufficient to bring the mass up to said polymerization temperature.

6. The process of claim 5 wherein the two drums are revolved at a speed between 4 and 8 r.p.m.

7. The process of claim 1 wherein during the preheating step the mass is passed through a series of screens disposed in a confined area to cause formation of the foam.

References Cited

UNITED STATES PATENTS

| 2,781,281 | 2/1957 | Berger | 23—105 UX |
| 2,982,613 | 5/1961 | Griffin. | |
| 2,992,930 | 7/1961 | Wheeler et al. | |
| 3,041,190 | 6/1962 | Griffith et al. | |
| 3,180,741 | 4/1965 | Wainer et al. | |
| 3,105,745 | 10/1963 | Vieli | 23—1 X |
| 3,220,804 | 11/1965 | Buchmann et al. | 23—1 X |

FOREIGN PATENTS 1,016,743   1/1966   Great Britain.

HERBERT T. CARTER, Primary Examiner

U.S. Cl. X.R.

23—1 R, 106 A, 315; 127—65; 162—159; 252—8.1; 260—89.1, 92.8